United States Patent
Huang

(10) Patent No.: US 8,081,004 B2
(45) Date of Patent: Dec. 20, 2011

(54) TESTING CARD FOR PERIPHERAL COMPONENT INTERCONNECT INTERFACES

(75) Inventor: Fa-Sheng Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 728 days.

(21) Appl. No.: 12/205,169

(22) Filed: Sep. 5, 2008

(65) Prior Publication Data

US 2010/0013495 A1    Jan. 21, 2010

(30) Foreign Application Priority Data

Jul. 21, 2008   (CN) .......................... 2008 1 0302862

(51) Int. Cl.
*H01H 31/02*     (2006.01)
*G01R 31/20*     (2006.01)

(52) U.S. Cl. .................................. 324/555; 324/754.07

(58) Field of Classification Search ............. 324/754.07, 324/555

See application file for complete search history.

(56) References Cited

U.S. PATENT DOCUMENTS

| | | | | |
|---|---|---|---|---|
| 5,852,725 | A * | 12/1998 | Yen ................................ | 710/301 |
| 7,631,134 | B2 * | 12/2009 | Jian ............................... | 710/301 |
| 2004/0017114 | A1 * | 1/2004 | Tseng et al. .................. | 307/125 |
| 2007/0101207 | A1 * | 5/2007 | Lin et al. ........................ | 714/56 |
| 2008/0155158 | A1 | 6/2008 | Yu et al. | |

FOREIGN PATENT DOCUMENTS

CN        101206603 A     6/2008

* cited by examiner

*Primary Examiner* — Amy He
(74) *Attorney, Agent, or Firm* — Altis Law Group, Inc.

(57) ABSTRACT

A testing card for peripheral component interconnection (PCI) interface includes a body, a plurality of PCI pins, a PCI interface chip, and a plurality of PCI testing pins. The PCI pins are mounted to the body. The PCI interface chip is mounted to the body and connected to the PCI pins. The PCI testing pins are mounted to the body and electrically connected to the pins of the PCI interface chip. When the PCI pins are connected to a PCI slot of a motherboard, the PCI interface chip is configured to communicate with the motherboard.

14 Claims, 1 Drawing Sheet

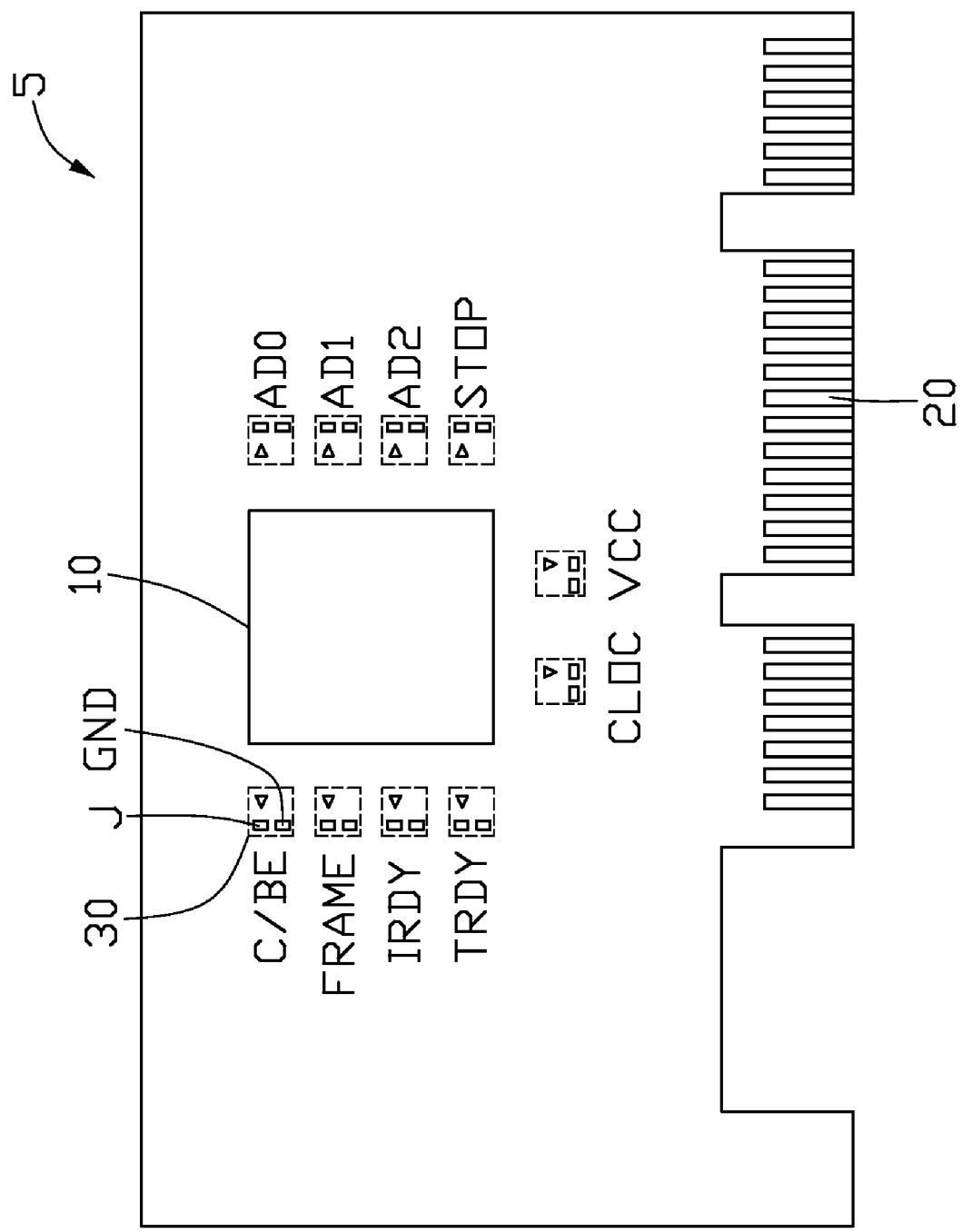

TESTING CARD FOR PERIPHERAL COMPONENT INTERCONNECT INTERFACES

BACKGROUND

1. Field of the Invention

The present invention relates to testing apparatuses and, more particularly, to a testing card for peripheral component interconnect (PCI) interfaces.

2. Description of Related Art

After a PCI device such as a video card, a sound card, or a network card is installed on a motherboard of a computer via a PCI interface, a test for verifying signal integrity of the PCI interface is needed. In a conventional test, a PCI expansion card is attached to the motherboard. Connecting wires are soldered to pins of the PCI expansion card. Test probes are connected to the connecting wires. However, soldering the connecting wires is time consuming, cumbersome, and poses risks of damage to circuitry on the motherboard.

What is desired, therefore, is to provide a testing card for PCI interface which can accurately and reliably measure signal performance of a PCI interface.

BRIEF DESCRIPTION OF THE DRAWING

The drawing is a schematic diagram of an embodiment of a testing card for a PCI interface.

DETAILED DESCRIPTION

Referring to the drawing, an embodiment of a testing card for a peripheral component interconnect (PCI) interface includes a body 5, a PCI interface chip 10, a plurality of PCI pins 20, and a plurality of PCI testing pins 30 mounted to the body 5. For exemplary purposes only, the plurality of PCI testing pins 30 includes ten PCI testing pins. Each of the PCI testing pins 30 includes a signal pin J and a ground pin GND. The ten signal pins J, as shown in the drawing, include a bus command or a byte enable pin C/BE, a PCI cycle frame pin FRAME, a PCI initiator ready pin IRDY, a PCI target ready indicator pin TRDY, a PCI clock pin CLOC, a voltage pin VCC, a stop pin STOP, and three multiplexed address and data bus pins AD0, AD1, AD2, which correspondingly connect to a C/BE pin, a PCI cycle frame pin, a PCI initiator ready pin, a PCI target ready indicator pin, a PCI clock pin, a voltage pin, a stop pin, and three multiplexed address and data bus pins of the PCI interface chip 10. Each of the ground pins GND is connected to a ground pin of the PCI interface chip 10. In the drawing, a triangle label is set on the body 5 at a side of each of the signal pins J for distinguishing them from the corresponding ground pin GND.

Pins of the PCI interface chip 10 are electrically connected to the PCI pins 20. The PCI testing pins 30 are electrically connected to the pins of the PCI interface chip 10. The PCI interface chip 10 communicates with the motherboard when the PCI pins 20 are connected to a PCI slot of a motherboard (not shown). A probe of an electronic testing device, such as an oscillograph, may be used to make contact with the PCI testing pins 30 to obtain parameters of the clock signals, reset signals, interrupt signals, data signals, and address signals of the PCI slot of the motherboard.

In one embodiment, the PCI interface chip 10 is set at an upper center portion of the body 5, the PCI pins 20 are set at a bottom right side of the body 5, and the PCI testing pins 30 are positioned around the PCI interface chip. A side of each of the PCI testing pins 30 may be labeled with the name of the corresponding signal pin. In other embodiments, the PCI interface chip 10 and the PCI pins 20 may be set on other locations of the body 5 according to need.

In use, the testing card is electrically connected to the PCI slot of the motherboard via the PCI pins 20. The probe of the oscillograph is electrically connected to one of the signal pins J. The motherboard is powered on and the waveform of a signal from one of the signal pins J may be displayed on the oscillograph. Users can determine if the signal of the one of the signal pins J accords with the PCI standard. Then the motherboard is powered off, and the oscillograph probe is electrically connected to another signal pin J to be tested and the motherboard is powered up again, and repeated for each of the signal pins J. Thus, all the signal pins may be tested one by one. Alternatively, all of the signal pins J may be tested at once.

The testing card for PCI interface is simple, can save time, and assure accurate measurements.

The foregoing description of the embodiments has been presented only for the purposes of illustration and description and is not intended to be exhaustive or to limit the embodiments to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the embodiments described therein.

What is claimed is:

1. A testing card for peripheral component interconnect (PCI) interfaces, comprising:
   a body;
   a plurality of PCI pins mounted to the body and for being connected to a PCI interface of a motherboard which is to be tested;
   a PCI interface chip mounted to the body and electrically connected to the PCI pins, to receive and output PCI signals from and to the motherboard through the PCI pins and the PCI interface of the motherboard; and
   a plurality of PCI testing pins mounted to the body and electrically connected to the PCI interface chip, and for being connected to an electronic testing device, to output the PCI signals of the PCI interface chip to the electronic testing device for testing.

2. The testing card as claimed in claim 1, wherein each of the PCI testing pins comprises a signal pin and a ground pin; the PCI interface chip comprises a ground pin and a plurality of chip pins corresponding to the signal pin of each of the PCI testing pins; each of the signal pins is connected to the corresponding chip pins.

3. The testing card as claimed in claim 2, wherein a side of each of the signal pins has a label.

4. The testing card as claimed in claim 2, wherein the ground pin of each of the PCI testing pins is connected to the ground pin of the PCI interface chip.

5. The testing card as claimed in claim 1, wherein the PCI interface chip is mounted at an upper center portion of the body, the PCI pins are positioned at a bottom right side of the body, the PCI testing pins are positioned around the PCI interface chip.

6. The testing card as claimed in claim 1, wherein a side of each of the PCI testing pins is labeled with a name of the corresponding signal pin.

7. The testing card as claimed in claim 1, wherein the plurality of PCI testing pins comprises ten PCI testing pins, each of the PCI testing pins comprises a signal pin, the signal pins of the ten PCI testing pins comprise a bus command/byte enable pin, a PCI cycle frame pin, a PCI initiator ready pin, a PCI target ready indicator pin, a PCI clock pin, a voltage pin, a stop pin, and three multiplexed address and data bus pins, which correspondingly connect to a bus command/byte enable pin, a PCI cycle frame pin, a PCI initiator ready pin, a PCI target ready indicator pin, a PCI clock pin, a voltage pin, a stop pin, and three multiplexed address and data bus pins of the PCI interface chip.

8. A testing card for peripheral component interconnect (PCI) interfaces, comprising:
   a body;
   a plurality of PCI pins mounted to the body;
   a PCI interface chip mounted to the body and electrically connected to the PCI pins; and
   a plurality of PCI testing pins mounted to the body and electrically connected to the PCI interface chip, wherein each of the PCI testing pins comprises a signal pin and a ground pin;
      wherein upon a condition that the PCI pins are connected to a PCI slot of a motherboard, the PCI interface chip communicates with the motherboard, the PCI interface chip comprises a ground pin and a plurality of chip pins corresponding to the signal pin of each of the PCI testing pins, and each of the signal pins of the PCI testing pins is connected to the corresponding chip pins.

9. The testing card as claimed in claim 8, wherein a side of each of the signal pins has a label.

10. The testing card as claimed in claim 8, wherein the ground pin of each of the PCI testing pins is connected to the ground pin of the PCI interface chip.

11. The testing card as claimed in claim 8, wherein the PCI interface chip is mounted at an upper center portion of the body, the PCI pins are positioned at a bottom right side of the body, the PCI testing pins are positioned around the PCI interface chip.

12. The testing card as claimed in claim 8, wherein a side of each of the PCI testing pins is labeled with a name of the corresponding signal pin.

13. The testing card as claimed in claim 8, wherein the plurality of PCI testing pins comprises ten PCI testing pins, each of the PCI testing pins comprises a signal pin, the signal pins of the ten PCI testing pins comprise a bus command/byte enable pin, a PCI cycle frame pin, a PCI initiator ready pin, a PCI target ready indicator pin, a PCI clock pin, a voltage pin, a stop pin, and three multiplexed address and data bus pins, which correspondingly connect to a bus command/byte enable pin, a PCI cycle frame pin, a PCI initiator ready pin, a PCI target ready indicator pin, a PCI clock pin, a voltage pin, a stop pin, and three multiplexed address and data bus pins of the PCI interface chip.

14. A testing card for peripheral component interconnect (PCI) interfaces, comprising:
   a body;
   a plurality of PCI pins mounted to the body;
   a PCI interface chip mounted to the body and electrically connected to the PCI pins; and
   a plurality of PCI testing pins mounted to the body and electrically connected to the PCI interface chip,
      wherein upon a condition that the PCI pins are connected to a PCI slot of a motherboard, the PCI interface chip communicates with the motherboard, the plurality of PCI testing pins comprises ten PCI testing pins, each of the PCI testing pins comprises a signal pin, the signal pins of the ten PCI testing pins comprise a bus command/byte enable pin, a PCI cycle frame pin, a PCI initiator ready pin, a PCI target ready indicator pin, a PCI clock pin, a voltage pin, a stop pin, and three multiplexed address and data bus pins, which correspondingly connect to a bus command/byte enable pin, a PCI cycle frame pin, a PCI initiator ready pin, a PCI target ready indicator pin, a PCI clock pin, a voltage pin, a stop pin, and three multiplexed address and data bus pins of the PCI interface chip.

* * * * *